United States Patent
Caldwell et al.

(10) Patent No.: US 7,650,115 B2
(45) Date of Patent: Jan. 19, 2010

(54) METHOD OF, AND APPARATUS FOR, PROTECTING FROM RADIO FREQUENCY INTERFERENCE

(75) Inventors: Richard J. Caldwell, Reigate (GB); Adrian W. Payne, Horley (GB)

(73) Assignee: IPG Electronics 503 Limited, St. Peter Port (GG)

( * ) Notice: Subject to any disclaimer, the term of this patent is extended or adjusted under 35 U.S.C. 154(b) by 221 days.

(21) Appl. No.: 10/550,337

(22) PCT Filed: Mar. 16, 2004

(86) PCT No.: PCT/IB2004/000854

§ 371 (c)(1),
(2), (4) Date: Sep. 22, 2005

(87) PCT Pub. No.: WO2004/086801

PCT Pub. Date: Oct. 7, 2004

(65) Prior Publication Data

US 2007/0010206 A1    Jan. 11, 2007

(30) Foreign Application Priority Data

Mar. 27, 2003  (GB) .................................. 0307033.1

(51) Int. Cl.
*H04B 1/00* (2006.01)
(52) U.S. Cl. .................. 455/63.1; 455/63.2; 455/67.13; 455/278.1; 455/396; 455/423; 455/425; 455/41.2; 455/556
(58) Field of Classification Search ................ 455/63.1, 455/64, 67.3, 556, 422, 63.2, 67.13, 278.1, 455/296, 423, 425, 41.2; 370/686.6, 506, 370/825.6
See application file for complete search history.

(56) References Cited

U.S. PATENT DOCUMENTS

| | | | | |
|---|---|---|---|---|
| 6,222,458 B1 * | 4/2001 | Harris | ...................... | 340/686.6 |
| 6,377,608 B1 * | 4/2002 | Zyren | ......................... | 375/132 |
| 6,968,157 B2 * | 11/2005 | Iliadis | ..................... | 455/67.13 |
| 7,046,990 B2 * | 5/2006 | Grego et al. | ................. | 455/410 |

(Continued)

FOREIGN PATENT DOCUMENTS

EP    0856999 A2    8/1998

(Continued)

OTHER PUBLICATIONS

Basedband Specification; Bluetooth Specification Version 1.1, Feb. 2001, pp. 92-147.

*Primary Examiner*—Matthew D Anderson
*Assistant Examiner*—April S Guzman
(74) *Attorney, Agent, or Firm*—Volpe and Koenig, P.C.

(57) ABSTRACT

A method of protecting an apparatus from radio frequency interference, comprises a policing terminal (PT) detecting the presence of an interfering radio terminal (16) in the protected environment and actively rendering ineffective or terminating transmissions by the interfering radio terminal. Various options can be followed by the policing terminal (PT) including (a) attempting to become the master station of a network of which the interfering terminal is a member and instructing the members to close down or (b) failing to become the master station and transmitting interference signals for at least a selected portion, for example preamble and sync, of the duration of a data packet transmitted by the interfering station.

12 Claims, 6 Drawing Sheets

U.S. PATENT DOCUMENTS

2002/0093929 A1 * 7/2002 Mangold et al. ............ 370/336

FOREIGN PATENT DOCUMENTS

| WO | 0131960 A1 | 5/2001 |
| WO | WO 01/31960 A1 * | 5/2001 |
| WO | 0169864 A2 | 9/2001 |
| WO | 0184789 A2 | 11/2001 |

* cited by examiner

METHOD OF, AND APPARATUS FOR, PROTECTING FROM RADIO FREQUENCY INTERFERENCE

The present invention relates to a method of protecting an apparatus from radio frequency interference, particularly inhibiting the operation of and/or preventing the establishment of wireless networks. The invention has application in, for example, restricted geographical areas such as hospital departments using sensitive electronic equipment which could be affected adversely by unauthorised electromagnetic radiation, or in protecting a wireless network.

Blocking of radio transmissions is not in itself new, for example, radio jamming by governmental agencies of undesired foreign broadcast transmissions not only in war time but also in peacetime. Such jamming involves making transmissions of say noise on the same frequency as the unwanted broadcast transmissions. In the field of cellular telephones it is known for example in GSM systems for people to illegally jam transmissions by transmitting wideband noise. A significant drawback to these known methods of radio jamming is that it is non-selective in that all transmissions are affected.

However there are situations in which a multitude of users are sharing a band of frequencies, such as the ISM band (2.400 to 2.4835 GHz), and attempts to jam one user affects many other users. Many authorised wireless networks, such as those operating in accordance with evolving standards such as Bluetooth™, Zigbee and IEEE 802.11b, may operate in a restricted geographical area such as a hospital or laboratory site but within that area there may be localities where unauthorised establishment of a wireless network should be prevented. However the method of prevention should avoid interfering with the operation of authorised wireless networks. The simple transmission of wideband noise would not achieve such a condition.

U.S. Pat. No. 6,377,608 discloses protecting a wireless local area network (WLAN) operating in the ISM band by means of a wireless beacon operating in the vicinity of an access point of the WLAN. The beacon transmits in a part of the ISM band which does not overlap that used by the WLAN. Ad hoc radios, such as frequency hopped spread spectrum radios, belonging to other networks operating in the same ISM band have beacon responsive radio control mechanisms which monitor the beacon channel for the presence of the wireless beacon. If detected, in one mode the ad hoc radio is adjusted so that it transmits in a selected portion of the ISM band other than that used by the WLAN. Other interference avoidance modes include deferring transmission on selected channels, altering frequency hopping pattern, changing from a frequency hopping mode to a fixed frequency mode, deactivating the transmitter of the ad hoc radio and reducing the transmit power of the ad hoc radio. The wireless beacon may be pulsed in order to reduce the overall transmit power. The ad hoc radio may monitor for the presence of a beacon signal by periodically switching its frequency synthesiser to the beacon frequency or frequencies.

The use of beacon signals contributes undesirably to the transmissions in the ISM band which themselves may interfere with other users of the ISM band as well as affect equipment which requires to be in an environment free from spurious electromagnetic radiation. Also it is the responsibility of the ad hoc radio to take action to avoid interfering with the WLAN which has the drawback that it may fail to respond to beacon signals because it cannot receive them and/or it is non-compliant due to a defect or the user is able to override any action instituted by the ad hoc radio.

An object of the present invention is for a system to be protected to take whatever action is appropriate to prevent an interferer from interfering with its operation.

According to one aspect of the present invention there is provided a method of protecting an apparatus from radio frequency interference in a predetermined radio frequency band, comprising, at a policing terminal, detecting the presence of a radio terminal operable to generate interference in the predetermined radio frequency band in accordance with a first predetermined signalling protocol, and transmitting a first signal matched to a characteristic of the first predetermined signalling protocol, wherein, in response to receiving the first signal, the radio terminal is inhibited as a source of interference.

According to a second aspect of the present invention there is provided a policing terminal for protecting an apparatus from radio frequency interference in a predetermined radio frequency band, comprising means for detecting the presence of a radio terminal operable to generate interference in the predetermined radio frequency band in accordance with a first predetermined signalling protocol, and means for transmitting a first signal matched to a characteristic of the first predetermined signalling protocol to inhibit the radio terminal as a source of interference.

According to a third aspect of the present invention there is provided an electronic apparatus comprising the policing terminal in accordance with the second aspect of the invention.

According to a fourth aspect of the invention there is provided a wireless network operable in accordance with the second signalling protocol and comprising a policing terminal in accordance with the second aspect of the invention.

Implementing the method in accordance with the present invention does not conflict with, for example, the current Federal Communications Commission (FCC) rules for transmission in the ISM band, and moreover causes minimum of disturbance to other systems operating in the ISM band. More particularly the method in accordance with the present invention enables the operation of unauthorised wireless network devices in a geographical area to be controlled whilst permitting operation of authorised wireless network devices in the same frequency band. The method in accordance with the present invention may be reactive in that a response is generated once a signal generated by an interfering terminal has been detected, or pro-active in that the policing terminal actively looks out for a potentially interfering terminal, for example by transmitting a signal that solicits a transmission from the potentially interfering terminal, so that it can take action before the interfering terminal becomes a nuisance.

By matching the first signal to a characteristic of the first predetermined protocol, the duration of the first signal can be minimised, thereby causing minimum disruption to the apparatus to be protected, whether that apparatus is a communications device or merely an apparatus that can be detrimentally affected by interference.

The matching to a characteristic of the first predetermined protocol may comprise selecting a message from the first predetermined signalling protocol, such as an end, disconnect, or terminate message that will inhibit transmission by the radio terminal.

Alternatively, the matching to a characteristic of the first predetermined protocol may comprise selecting the time of transmission of the first signal to interfere with at least a portion of a transmission made by the radio terminal in accordance with the first predetermined signalling protocol. In this way, attempts at communication by the radio terminal are rendered ineffective and the radio terminal ceases attempting to communicate, thus further transmission is inhibited.

The matching is in contrast to known jamming methods which do not exploit the protocol characteristics of the signals to be protected against and which therefore must transmit a jamming signal for an indefinite period to ensure successful jamming, and thereby create additional interference.

The period of time for which the radio terminal is inhibited from transmission may be predetermined, for example being defined by the first signalling protocol. The duration of the first signal may be selected to be shorter than the period for which the radio terminal is inhibited from transmission. In this way, the protection from interference lasts longer than the duration of the first signal which is transmitted to effect the protection.

According to the invention there is further provided a method of protecting a radio frequency environment, comprising detecting the presence of an interfering terminal involved with a radio transmission in an environment to be protected, determining at least one characteristic of the radio transmission, and using knowledge of the at least one characteristic to render ineffective radio transmissions by the interfering terminal in the environment to be protected.

According to the invention there is further provided a wireless network comprising a plurality of radio stations, at least one of said radio stations functioning as a policing terminal to protect the service area of the network against signals produced by an interfering terminal, the policing terminal having means for determining at least one characteristic in signals produced by the interfering terminal and for using knowledge of the at least one characteristic to render ineffective signals produced by the interfering terminal.

According to the invention there is further provided a policing terminal for protecting a radio frequency environment against signals produced by an interfering terminal, the policing terminal having means for determining at least one characteristic in signals produced by the interfering terminal and for using knowledge of the at least one characteristic to render ineffective signals produced by the interfering terminal.

The present invention will now be described, by way of example, with reference to the accompanying drawings, wherein.

In the drawings the same reference numerals have been used to indicate corresponding features.

For convenience of description the present invention will be described with reference to interfering radio devices operating in accordance with the Bluetooth™ standard but it is to be understood that the teachings of the present invention can be applied to wireless local area networks (WLANS) using radio devices operating in accordance with other standards such as Zigbee and IEEE 802.11b which also operate in the ISM band, namely 2.4000 to 2.4835 GHz. Transmissions may be direct sequence spread spectrum (DSSS) or frequency hopped spread spectrum (FHSS).

Details of the Bluetooth™ Specification Version 1.1 are publicly available (www.bluetooth.com) and are incorporated by way of reference. However certain details of the Specification relevant to the implementation of the present invention will be given.

The Bluetooth™ radio frequency system is a frequency hopping spread spectrum system where data packets having a duration of 625 μs are transmitted in defined channel frequencies lying in the ISM band, the individual channels being separated by 1 MHz. The hopping sequence is determined by the master station.

Every Bluetooth™ terminal has an internal system clock which determines the timing and hopping of a transceiver in the terminal. For synchronisation with other terminals forming the wireless network, the current master station notifies its slave stations of what timing offsets each should apply to its own clock in order to mutually synchronise the local clocks in the terminals. The master station always has full control over the wireless network. Also due to a stringent time division duplex (TDD) scheme slave stations can only communicate with the master station and not to other slave stations.

It is possible for a master-slave switch to take place where there is a role change in which the master slave becomes a slave station and the former slave station becomes the master station. However the wireless network parameters which were derived from the address and clock of the original master station remain unchanged.

A data packet has several fields including synchronisation, preamble and address, a header with link information and user data.

Figure 1:
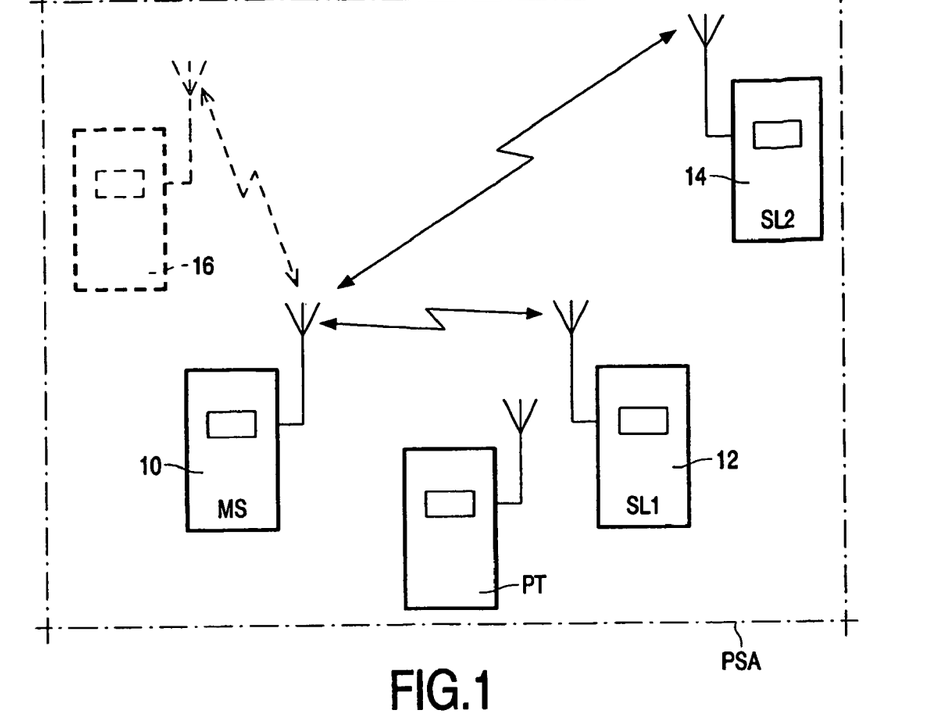
FIG. 1 is a block schematic diagram illustrating a service area of a wireless network.

Referring to FIG. 1, there is shown a closed service area PSA of a wireless network in which authorised radio terminals 10, 12, 14 are either fixed or able to roam and maintain radio contact with each other. The terminals 10, 12 and 14 operate in accordance with the IEEE 802.11b standard. One of the terminals, say the terminal 10 functions as a master station MS and the remainder of the terminals 12, 14 function as slave stations.

The wireless network is a closed network insofar that other interfering terminals, such as terminal 16, entering the service area PSA will not only be prevented from joining the wireless network but also will actively be dissuaded from operating. The master station 10 can assume the role of policing the wireless network or a dedicated policing terminal PT can monitor the radio activity and in response to detecting the presence of an interfering terminal can take action to deter it. Ideally in this role the policing terminal PT is able to adopt the operating mode, for example Bluetooth™, in order to be able to communicate with the interfering network to which the terminal 16 belongs as well as its own IEEE 802.11b network.

Figure 2:
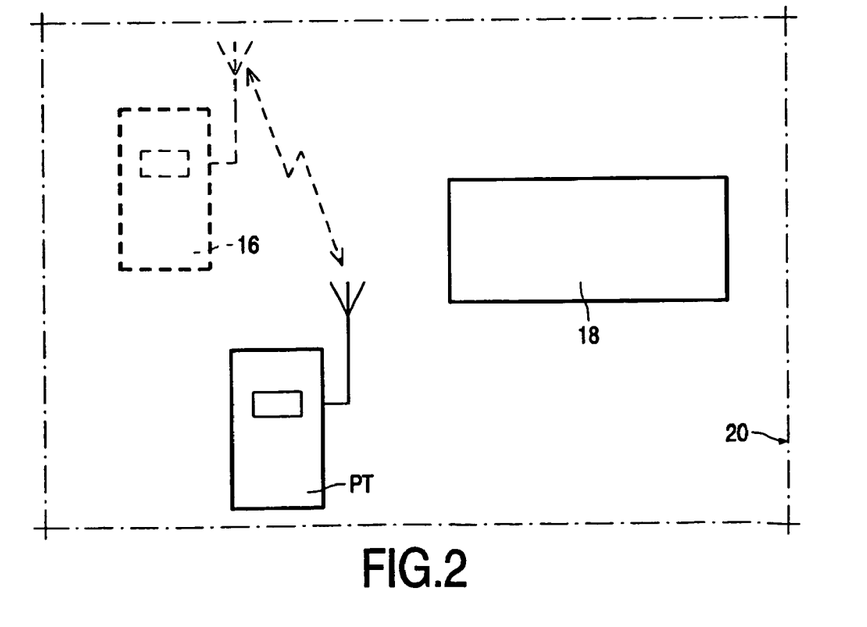
FIG. 2 is a block schematic diagram illustrating a geographical environment in which is located sensitive apparatus to be protected from electromagnetic radiation.

Referring to FIG. 2, the situation illustrated relates to protecting a piece of apparatus 18 whose operation is adversely affected by electro-magnetic radiation such as that emitted by a Bluetooth™ terminal in an excluded geographical area 20 around the apparatus 18. The protection is effected by a policing terminal PT monitoring for unwanted radio activity in the geographical area 20.

Figure 3:
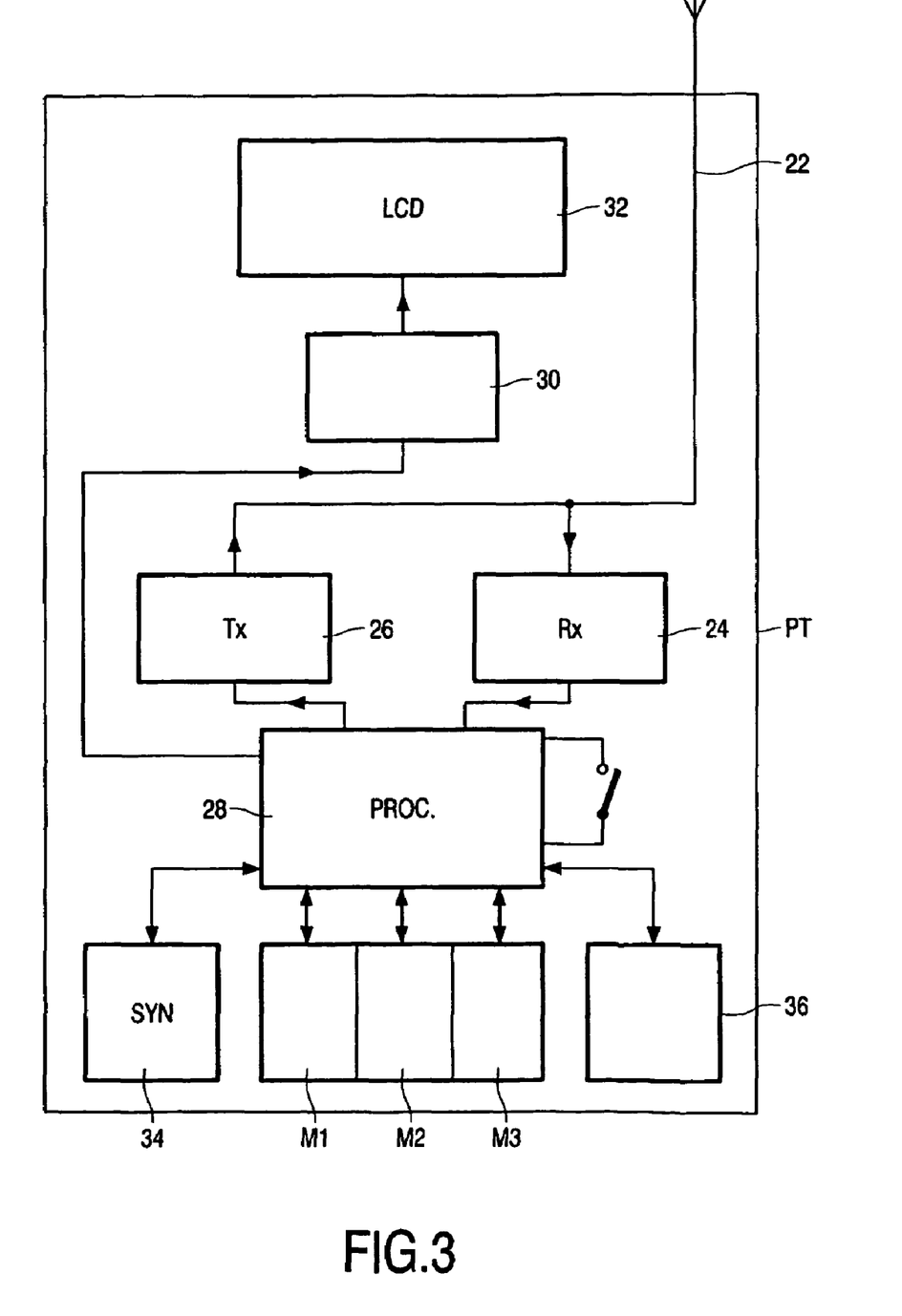
FIG. 3 is a block schematic diagram of a policing terminal which can be used to disable an interfering radio entering a service area of a wireless network or a protected geographical environment, FIGS. 4 and 5 together comprise a flow chart illustrating methods of protecting an environment when a wireless network is present.

FIG. 3 is a block schematic diagram of a policing terminal PT the architecture of which is similar to the terminals 10,12, 14 and perhaps 16. The policing terminal comprises an antenna 22 which is connected to a receiver 24 and a transmitter 26. A processor 28 is provided for controlling the operation of the terminal in accordance with a program stored in a memory M1. The processor 28 has a plurality of ports for connection to the receiver 24, the transmitter 26, a LCD driver 30 for driving a LCD panel 32, a frequency synthesiser 34, a noise generator 36, a memory M2 for storing the operating standard, for example IEEE 802.11b, of the wireless network that it is to be protected and a memory M3 for storing the operating standard, for example Bluetooth™ (abbreviated as BT), of the interfering terminal 16.

The policing terminal PT can respond to the detection of unwanted electromagnetic radiation in the ISM band, in this instance interfering Bluetooth™ signals in several ways depending on particular circumstances.

A normal BT packet contains a short sync word, a preamble containing the BT address of the destination (or slave) terminal, a header that contains other link information and finally the actual user data. The data and header are normally mixed with a random signal that is generated by reference to the master station's clock (6 of its bits) to ensure that the signal transmitted over the air is sufficiently random in nature to allow the radio hardware to function correctly. A BT network hops from one frequency to another for each packet, the pattern or the hopping sequence is derived from the clock in the master station.

A normal BT connection set-up works as follows: A master station transmits a plurality of inquiry packets on several frequencies. These inquiry packets have a general address in their preamble so it is easy to search for. In order for a terminal to be contacted it must be looking for these inquiry packets. There is no requirement that any terminal should be doing this at any particular time, if ever. The normal enquiry procedure can take up to 40 seconds, although it is usually completed quicker, due to the random frequencies and timing of the two terminals' transmissions and receptions.

The response from the slave station to the inquiry is a conventional FHSS packet which contains the slave station's address and clock. This allows the master station to address directly the slave station when the link is set up subsequently during the page function. The page function is carried out once the master and slave stations know of each other's existence. The master station sends a paging packet to the specific slave station with the slave station's address in the packet preamble. The response to the page by the slave station is an acknowledgement of receipt. The master station then responds with another FHS packet to give the slave station the clock timing so that the final link hopping sequence can be used. The next communication between the two stations is the data.

The terminal that starts the process will normally become the master station of the network, although as mentioned above a master-slave switch can be made when the link is established.

In order to implement the method in accordance with the present invention there are two categories of methods to prevent BT networks from existing, namely, (1) removing an already existing network, and (2) preventing the establishment of a network when none exists already.

Figure 4:
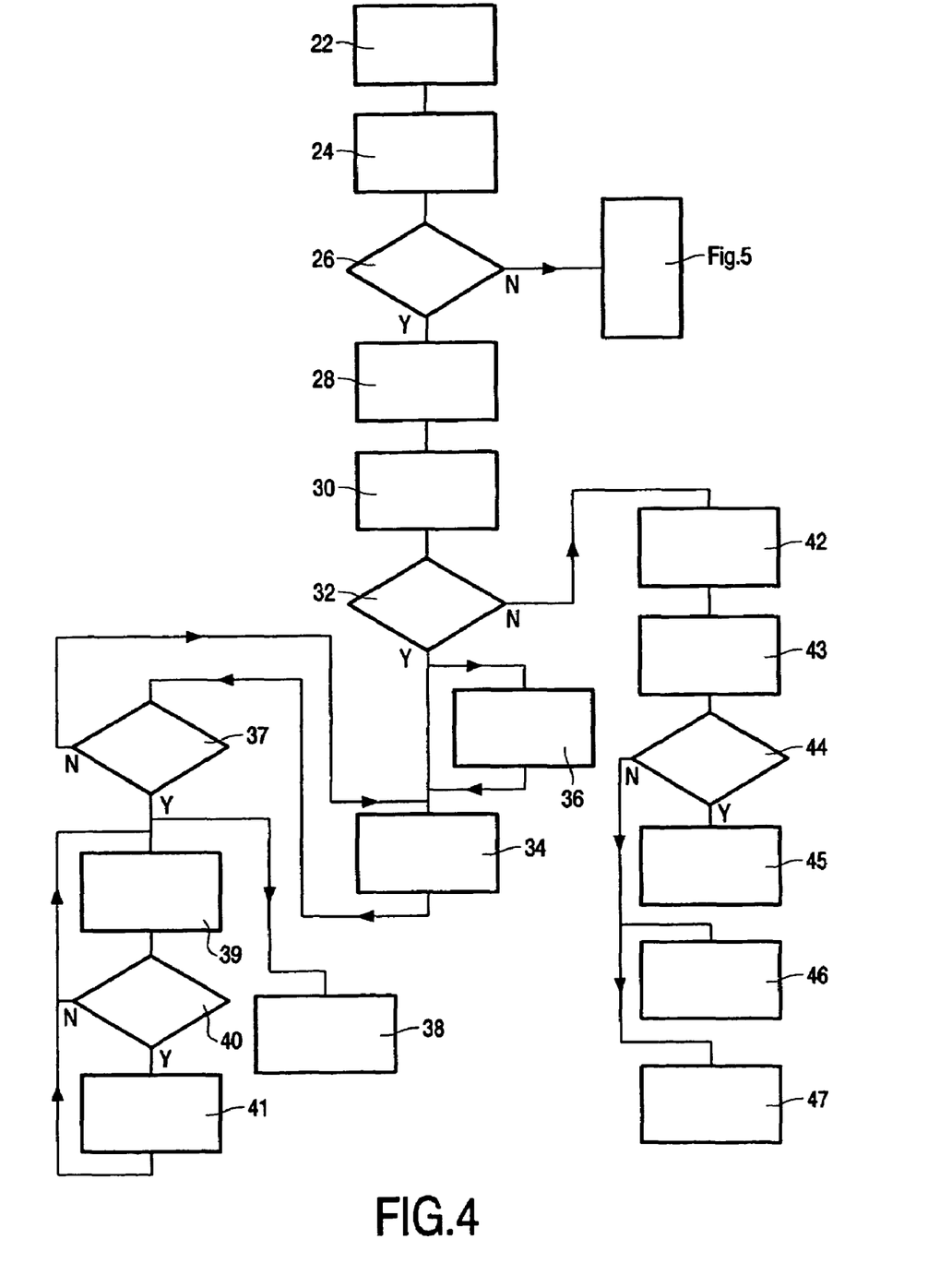
Figure 5:
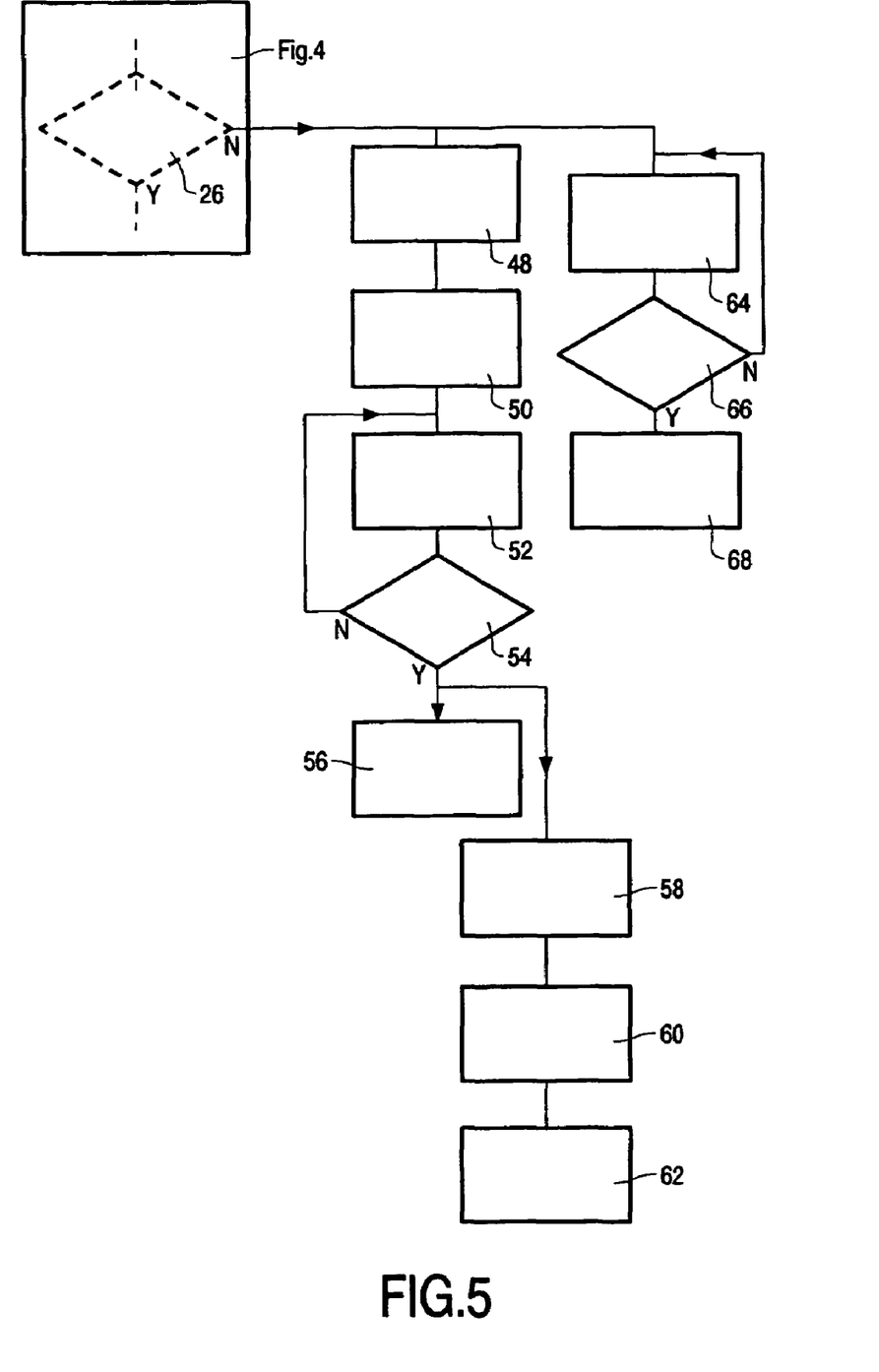

FIGS. 4 and 5 comprise a flow chart of the type of operations involved when implementing category (1). Referring to FIG. 4, block 22 relates to a policing terminal PT detecting that an existing wireless network interferes with the wireless network to be protected. Block 24 relates to the policing terminal PT adapting itself to mimic a Bluetooth™ slave station and endeavouring to join the interfering wireless network by transmitting a response to inquiry messages transmitted by the master station of the interfering wireless network. Block 26 relates to checking if the attempt has been successful. If the response is Yes (Y) then in block 28 the master station allows the slave station to join the interfering wireless network. In block 30 the slave station attempts to swap the master/slave roles. In a block 32 a check is made that the master-slave swap has been successful. In the course of the successful swap the slave station as the new master station will be given the addresses of other slave stations in the interfering wireless network. If the swap has been successful (Y) then in block 34 the new master station can transmit a disconnect message to each of the slave stations. A user may try to rejoin the wireless network only to find that his slave station disconnects. It is assumed that if frustrated enough times the user will give up. Thus the interfering wireless network is closed.

Thereafter the policing terminal PT checks that the disconnection of the slave station has been successful, block 37. If it has been successful (Y) then the policing terminal PT can either continue mimicking the master station, block 38, or listen for the original (interfering) master station attempting to restart, block 39. In block 40 a check is made to see if the original master station is attempting to restart. If the answer is yes (Y) then in block 41 the original master station is disconnected to prevent it from restarting. If the answer in the block 40 is negative (N) then the flow chart reverts to the block 39. The output from the block 41 also reverts to the block 39 to prevent further attempts by the master station to restart. The output from block 41 also reverts to the block 39 in case the master station makes further attempts to restart.

If the answer in the block 37 is negative (N) the flow chart reverts to the block 34.

In an optional variant variant of this flow chart, block 36 relates to an audible message or a message to be displayed on the LCD panel being sent to the slave stations saying that the network is being terminated and giving a reason for the termination thus hopefully avoiding a user trying to re-join the network. Thereafter the flow chart proceeds to the process stage 34.

Reverting to the block 32, in the event of a failure (N) in the attempt to swap master and slave roles, the policing terminal PT is nevertheless a member of the interfering wireless network and as such is given details of the hopping sequence. In a block 42 the policing terminal PT listens to all the packet headers in order to learn the BT addresses of all the terminals in the wireless network. In a block 43 the policing terminal PT mimics the master station. In block 44 a check is made to see if the mimicry has been successful. If it is successful (Y) then in block 45 the policing terminal PT tells all the other slave stations to disconnect. If this is unsuccessful (N), in block 46 the policing terminal PT transmits a short burst of noise onto the current frequency during preamble or sync word to effectively and efficiently destroy each packet on the interfering network. However depending on the operating standard of the protected wireless network there is a risk of it being affected adversely if there is coincidence with one or more of the frequencies of its hopping sequence and clocks. In which case the policing terminal PT may decide to do nothing, block 47, thereby avoiding interfering with the wireless network it is protecting.

Reverting to the block 26, if the policing terminal PT is refused access to the interfering network (N) the master station's clock is unknown. Referring now to FIG. 5, in block 48 the policing terminal PT listens to the wireless network and in block 50 it calculates the slot timing of the interfering network. Additionally in block 52 the policing terminal PT listens to the BT addresses of all the devices in the interfering network, this being possible as the normal BT packet header gives the address of the receiving (or slave) station. In block 54 a check is made that all, or alternatively some, of the addresses have been obtained. If the answer is Yes (Y) then in block 56 the policing terminal PT mimics a BT master station and transmits a disconnect signal to each of the stations in the interfering wireless network on a single frequency, with a random whitening pattern included in a field of the signal in place of clock information; correct clock information cannot be included because it is unknown to the policing terminal (PT). Such random clock information results in the information being correct by chance once in every 3 seconds (625 µs×79×64; 6 bits of information transmitted at intervals of 625 µs on 79 frequencies). In the event of not having obtained all the addresses (N) (block 54) the flow chart reverts to the block 52.

Block 58 relates to the policing terminal PT, gaining, for example by a method to be described later, the address of the master station and clock of the interfering network. In block 60 the policing terminal PT calculates the hopping pattern of the interfering wireless network. In block 62 the policing terminal PT having determined the hopping pattern disables the interfering wireless network more rapidly than would have been possible otherwise.

Blocks 64 to 68 relate to another technique which can be used when access is denied by a master station to its wireless network. In the block 64 the policing terminal PT scans the entire ISM band in less time than the duration of one BT packet for the detection of signals. Block 66 relates to checking if any signals have been detected. If they have (Y) then in block 68 noise is transmitted on top of the signals. If no signals are detected (N) in the block 66 the flow chart reverts to the input of the block 64. Due to the time required to retune a frequency synthesiser, it may be necessary to split the ISM band into larger portions. As long as the noise transmissions from the policing terminal PT catch the end of each BT packet the link is destroyed, and the user or application (in the case of fixed equipment) will give up.

In all the applications in which the policing terminal PT is trying to mimic another device it is preferable for it to start its transmissions very slightly earlier, say 10 µs earlier in the case of Bluetooth™ than that of the station which it is trying to imitate. By doing this the receiving station is more likely to lock onto the transmissions from the policing terminal PT than those of the station to be disconnected.

Figure 6:
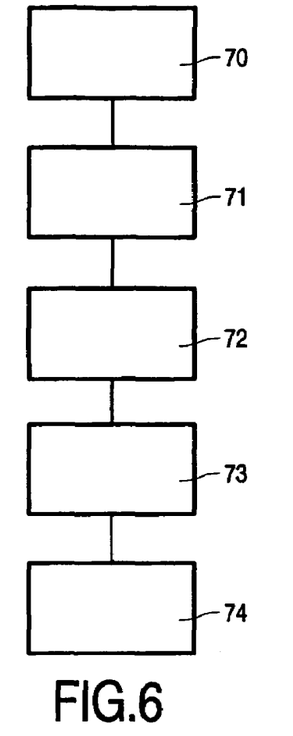
FIG. 6 is a flow chart illustrating a transmit method of protecting an environment when a low power LAN does not exist.
Figure 7:
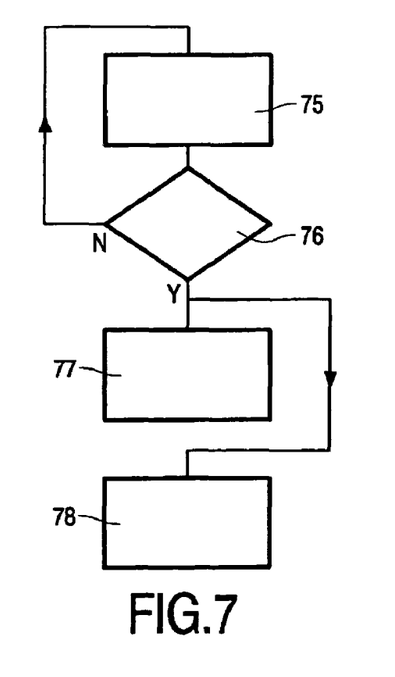
FIG. 7 is a flow chart illustrating a receive method of protecting an environment when a wireless network does not exist.
Figure 8:
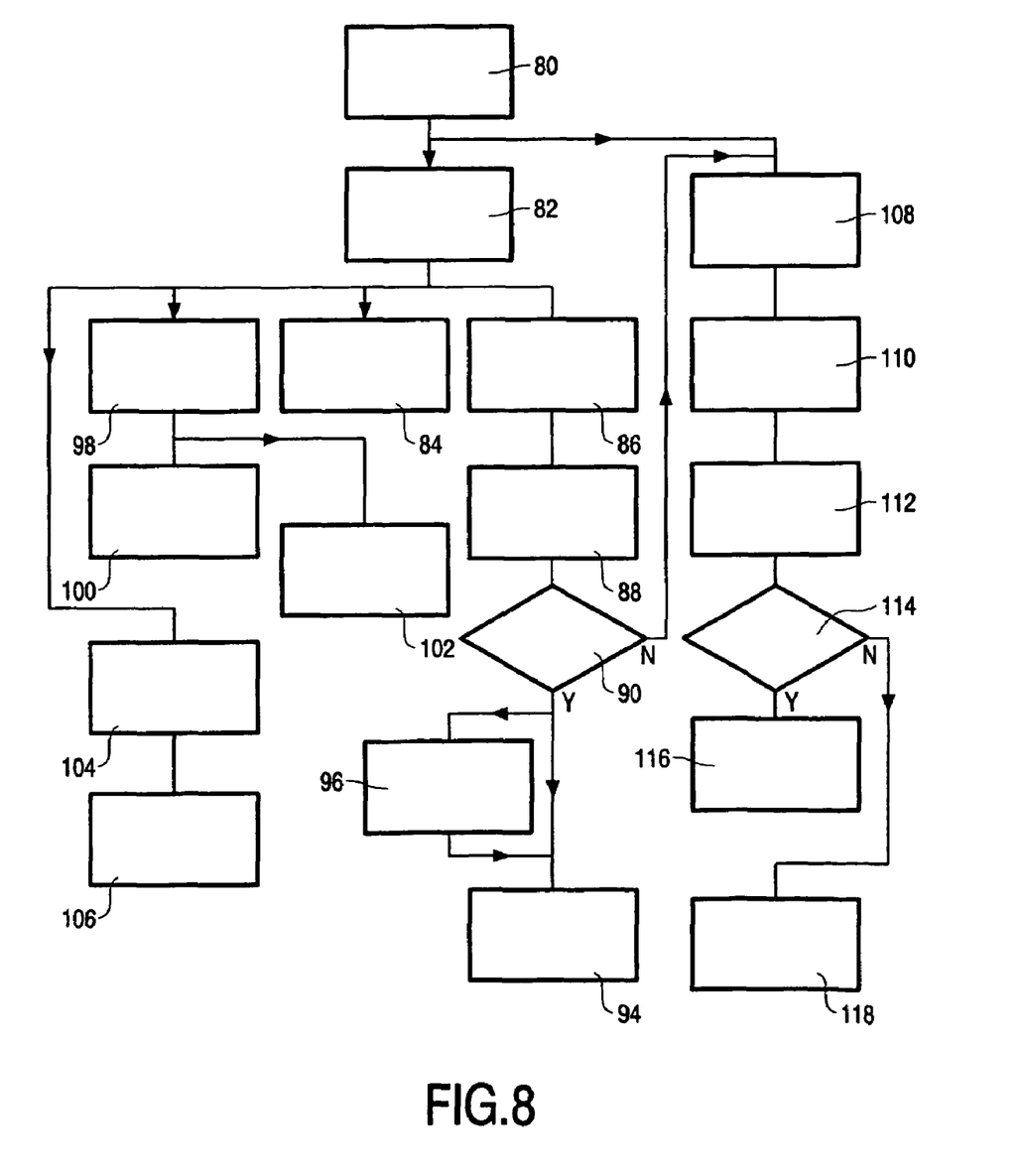
FIG. 8 is a flow chart illustrating other receive methods of protecting an environment when a wireless network does not exist.

FIGS. 6, 7 and 8 are flow charts relating to the second category of preventing the establishment of a network when none exists already or a network has been disconnected. This category can be divided into transmit (FIG. 6) and receive (FIGS. 7 and 8) sub-categories.

In the case of transmit sub-category (FIG. 6), if it is desired to protect a IEEE 802.11b network, in block 70 a policing terminal PT transmits inquiry packets synchronised to avoid disrupting transmissions of the network to be protected. This will gather up any new stations roaming into the range of the network to be protected. In block 71 the policing terminal PT connects to those stations which respond to the inquiry packets. In block 72 the policing terminal PT captures their clock and address and in block 73 stores this information so that if in future they try to initiate any networks themselves, their clock and BT address will be generally known and from this information it will be possible to derive its hop pattern later. Finally in block 74 the slave stations gathered up are either disconnected or kept in a low power mode.

In a first receive sub-category (FIG. 7), block 75 relates to the policing terminal PT listening for different types of packets which may occur when a new WLAN is forming. In block 76 a check is made to see if any packets have been detected. If the answer is yes (Y) then in block 77, the policing terminal PT mimics the master station and proceeds to disconnect its slave stations. Alternatively in block 78 the policing terminal PT interferes with the soon-to-be created master station.

In the receive sub-category (FIG. 8), in block 80 the policing terminal PT listens for a new device transmitting inquiry packets. In block 82 the policing terminal PT detects such packets. At this point various options may be followed. Firstly in block 84 the policing terminal PT can transmit wideband noise with a view to disrupt the formation of a network. The wider the bandwidth the policing station PT can detect and transmit noise over the better.

Secondly in block 86, the policing terminal PT mimics the operating standard of the interfering wireless network and responds to the inquiry packet by attempting to join the new network as a slave station. In block 88 the slave station attempts to effect a master/slave swap. In block 90 a check is made to see if the attempt is successful and if it is (Y) the new master endeavours to disconnect the other slave stations (block 94). Optionally in block 96 the policing terminal PT transmits audible or data messages to the slave stations informing them of the impending termination. If the master/slave swap is unsuccessful (N) the flow chart follows the process steps 108 to 118 to be described later.

Thirdly, if while the policing terminal PT is listening it hears other network setup packets there are actions which can be taken at each stage. If an inquiry packet is heard from a device then in block 98 the inquiry packet is duplicated and in block 100 the policing terminal PT uses the duplicate inquiries to snare any potential slave station and thus keep it from communicating with other stations. Alternatively in block 102 the policing terminal PT may try to disrupt the inquiry packets with noise.

Fourthly, in a further alternative the policing terminal PT in block 104 mimics a slave station and in block 106 stops the master station from looking for his real slave.

Fifthly, in block 108 the policing terminal PT listens for a paging packet. If the master station's response is heard during a paging period, then in block 110 the policing terminal PT detects the master's clock. In block 112 the policing terminal PT attempts to mimic the master station. In block 114 a check is made to see if the attempt has been successful, if it has (Y) then in block 116 the other slave stations are told to disconnect. Alternatively if the attempt has been unsuccessful (N) then in block 118 the policing terminal PT transmits noise.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of low power local area networks and component parts therefor and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of protecting an apparatus from radiofrequency interference in a predetermined radio-frequency band, comprising, at a policing terminal:
   detecting the presence of a radio terminal operable to generate interference in the predetermined radio-frequency band and in accordance with a first predetermined signaling protocol, wherein the signaling protocol specifies operation of a wireless local area network in which the network comprises a plurality of terminals, and wherein the protocol requires that the operation of the terminals is either as a slave station or as a master station;
   transmitting a first signal in accordance with the first predetermined signaling protocol;
   wherein, in response to the transmission of the first signal, the radio terminal is inhibited as a source of interference; and
   wherein if the radio terminal forms part of an existing network, the first signal is such that:
   the policing terminal mimics a slave station of the existing network by transmitting a response to inquiry messages from the master station, so as to join the existing network;
   the policing terminal transmits a signal to swap the master/slave roles; and
   the policing terminal, acting as master station, transmits a disconnect message to each of the slave stations.

2. A method as claimed in claim 1 wherein the policing terminal, when mimicking the slave station, starts its transmissions slightly earlier than the station which it is trying to mimic.

3. A method of protecting an apparatus from radiofrequency interference in a predetermined radio-frequency band, comprising, at a policing terminal:
   detecting the presence of a radio terminal operable to generate interference in the predetermined radio-frequency band and in accordance with a first predetermined signaling protocol, wherein the signaling protocol specifies operation of a wireless local area network in which the network comprises a plurality of terminals, and wherein the protocol requires that the operation of the terminals is either as a slave station or as a master station;
   transmitting a first signal in accordance with the first predetermined signaling protocol;
   wherein, in response to the transmission of the first signal, the radio terminal is inhibited as a source of interference; and
   wherein if the radio terminal forms part of an existing network, the first signal is such that:
   the policing terminal mimics a slave station of the existing network by transmitting a response to inquiry messages from the master station, so as to join the existing network;
   the policing terminal detects the addresses of the other terminals in the network; and
   the policing terminal mimics the master station, and then transmits a disconnect message to each of the slave stations.

4. A method as claimed in claim 3 wherein the policing terminal, when mimicking the slave station and when mimicking the master station, starts its transmissions slightly earlier than the station which it is trying to mimic.

5. A method of protecting an apparatus from radiofrequency interference in a predetermined radio-frequency band, comprising, at a policing terminal:
   detecting the presence of a radio terminal operable to generate interference in the predetermined radio-frequency band and in accordance with a first predetermined signaling protocol, wherein the signaling protocol specifies operation of a wireless local area network in which the network comprises a plurality of terminals, and wherein the protocol requires that the operation of the terminals is either as a slave station or as a master station;
   transmitting a first signal in accordance with the first predetermined signaling protocol;
   wherein, in response to the transmission of the first signal, the radio terminal is inhibited as a source of interference; and
   wherein if the radio terminal forms part of an existing network, the first signal is such that:
   the policing terminal mimics a slave station of the existing network by transmitting a response to inquiry messages from the master station, so as to join the existing network; and
   the policing terminal transmits a short burst of noise at the current frequency during preamble or sync word transmission in the network, to effectively destroy each packet on the network.

6. A method as claimed in claim 5 wherein the policing terminal, when mimicking the slave station, starts its transmissions slightly earlier than the station which it is trying to mimic.

7. A method of protecting an apparatus from radiofrequency interference in a predetermined radio-frequency band, comprising, at a policing terminal:
   detecting the presence of a radio terminal operable to generate interference in the predetermined radio-frequency band and in accordance with a first predetermined signaling protocol, wherein the signaling protocol specifies operation of a wireless local area network in which the network comprises a plurality of terminals, and wherein the protocol requires that the operation of the terminals is either as a slave station or as a master station;
   transmitting a first signal in accordance with the first predetermined signaling protocol;
   wherein, in response to the transmission of the first signal, the radio terminal is inhibited as a source of interference; and
   wherein if the radio terminal forms part of an existing network:
   the policing terminal calculates the slot timing of the network, and detects the addresses of all the stations in the existing network;
   and the first signal is such that:
   the policing terminal mimics a master station of the existing network by transmitting a disconnect signal to each of the stations on a single frequency, with random clock information in place of network clock information.

8. A method as claimed in claim 7 wherein the policing terminal, when mimicking the slave station, starts its transmissions slightly earlier than the station which it is trying to mimic.

9. A method of protecting an apparatus from radiofrequency interference in a predetermined radio-frequency band, comprising, at a policing terminal:
   detecting the presence of a radio terminal operable to generate interference in the predetermined radio-frequency band and in accordance with a first predetermined signaling protocol, wherein the signaling protocol specifies operation of a wireless local area network in which the network comprises a plurality of terminals, and wherein the protocol requires that the operation of the terminals is either as a slave station or as a master station;

transmitting a first signal in accordance with the first predetermined signaling protocol;

wherein, in response to the transmission of the first signal, the radio terminal is inhibited as a source of interference; and wherein if the radio terminal does not form part of an existing network:

the policing terminal detects signal packets of the types which occur when a new network is being formed; and the policing terminal mimics a master station of the network that is being formed, by transmitting a disconnect signal to each of the slave stations.

10. A method of protecting an apparatus from radiofrequency interference in a predetermined radio-frequency band, comprising, at a policing terminal:

detecting the presence of a radio terminal operable to generate interference in the predetermined radio-frequency band and in accordance with a first predetermined signaling protocol, wherein the signaling protocol specifies operation of a wireless local area network in which the network comprises a plurality of terminals, and wherein the protocol requires that the operation of the terminals is either as a slave station or as a master station;

transmitting a first signal in accordance with the first predetermined signaling protocol;

wherein, in response to the transmission of the first signal, the radio terminal is inhibited as a source of interference; and wherein if the radio terminal does not form part of an existing network:

the policing terminal detects inquiry packets indicating that a new network is being formed,;

the policing terminal joins the network as a slave station;

the policing terminal transmits a signal to swap the master/slave roles; and the policing terminal, acting as master station, transmits a disconnect message to each of the slave stations.

11. A method of protecting an apparatus from radiofrequency interference in a predetermined radio-frequency band, comprising, at a policing terminal:

detecting the presence of a radio terminal operable to generate interference in the predetermined radio-frequency band and in accordance with a first predetermined signaling protocol, wherein the signaling protocol specifies operation of a wireless local area network in which the network comprises a plurality of terminals, and wherein the protocol requires that the operation of the terminals is either as a slave station or as a master station;

transmitting a first signal in accordance with the first predetermined signaling protocol;

wherein, in response to the transmission of the first signal, the radio terminal is inhibited as a source of interference; and wherein if the radio terminal does not form part of an existing network:

the policing terminal detects paging packets indicating that a new network is being formed;

the policing terminal detects the clock information of the master station; and the policing terminal mimics the master station, and then transmits a disconnect message to each of the slave stations.

12. A policing terminal for protecting an apparatus from radiofrequency interference in a predetermined radio-frequency band, the policing terminal comprising:

a processor configured to detect the presence of a radio terminal operable to generate interference in the predetermined radio-frequency band and in accordance with a first predetermined signaling protocol, wherein the signaling protocol specifies operation of a wireless local area network in which the network comprises a plurality of terminals, and wherein the protocol requires that the operation of the terminals is either as a slave station or as a master station;

a transmitter configured to transmit a first signal in accordance with the first predetermined signaling protocol;

wherein, in response to the transmission of the first signal, the radio terminal is inhibited as a source of interference; and wherein the processor is configured to mimic a station of such a network; and the transmitter is configured to transmit a disconnect message to each of the slave stations.

* * * * *